United States Patent
Yoshimura et al.

(10) Patent No.: US 10,883,155 B2
(45) Date of Patent: Jan. 5, 2021

(54) METHOD FOR RECOVERING GOLD FROM AN ORE OR A REFINING INTERMEDIATE CONTAINING GOLD

(71) Applicant: JX NIPPON MINING & METALS CORPORATION, Tokyo (JP)

(72) Inventors: Akira Yoshimura, Hitachi (JP); Yoshifumi Abe, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 166 days.

(21) Appl. No.: 15/766,954

(22) PCT Filed: Mar. 30, 2017

(86) PCT No.: PCT/JP2017/013456
§ 371 (c)(1),
(2) Date: Apr. 9, 2018

(87) PCT Pub. No.: WO2017/170960
PCT Pub. Date: Oct. 5, 2017

(65) Prior Publication Data
US 2018/0298465 A1    Oct. 18, 2018

(30) Foreign Application Priority Data

Mar. 31, 2016    (JP) .................................. 2016-073334

(51) Int. Cl.
C22B 3/00    (2006.01)
C22B 3/10    (2006.01)
C22B 3/06    (2006.01)

(52) U.S. Cl.
CPC .............. *C22B 11/04* (2013.01); *C22B 3/06* (2013.01); *C22B 3/10* (2013.01); *Y02P 10/20* (2015.11)

(58) Field of Classification Search
CPC .............. C22B 3/06; C22B 3/10; C22B 11/04
See application file for complete search history.

(56) References Cited

U.S. PATENT DOCUMENTS

| 2009/0158894 A1 | 6/2009 | Haavanlammi et al. |
| 2009/0241735 A1 | 10/2009 | Abe et al. |
| 2017/0247777 A1* | 8/2017 | Lundstrom ............. C22B 11/06 |

FOREIGN PATENT DOCUMENTS

| AU | 2012244197 A1 | 6/2013 |
| AU | 2013204508 A1 | 3/2014 |

(Continued)

OTHER PUBLICATIONS

Espacenet family data for WO 2014156350 and CA 2884363 (Year: 2014).*

(Continued)

*Primary Examiner* — Tima M. McGuthry-Banks
(74) *Attorney, Agent, or Firm* — Birch, Stewart, Kolasch & Birch, LLP

(57) ABSTRACT

A method for recovering gold from an ore or a refining intermediate containing gold, comprising a step of contacting a gold-containing raw material obtained from the ore or the refining intermediate with an acidic solution containing a copper ion, an iron ion and a halide ion while supplying an oxidizing agent to leach the gold component in the raw material. The halide ion in the acidic solution is only a bromide ion, wherein the concentration of the bromide ion in the acidic solution is 100 g/L or more or the concentration of the bromide ion in the acidic solution is less than 100 g/L. When the concentration of the bromide ion is less than 100 g/L, a concentration ratio of the halide ion in the acidic solution is such that a ratio of the concentration of the chloride ion to the concentration of the bromide ion is ⅓ or less.

4 Claims, 2 Drawing Sheets

(56) References Cited

FOREIGN PATENT DOCUMENTS

| AU | 2013204948 A1 | 10/2014 | |
|---|---|---|---|
| CA | 1340169 C | 12/1998 | |
| CA | 2884363 A1 * | 3/2014 | ............... C22B 3/10 |
| JP | 2009-526912 A | 7/2009 | |
| JP | 2014-205869 A | 10/2014 | |
| WO | WO 2014/156350 A1 | 10/2014 | |
| WO | WO 2014156350 A1 * | 10/2014 | ............... C22B 3/10 |
| WO | WO 2016134420 A1 * | 9/2016 | ............. C22B 11/04 |

OTHER PUBLICATIONS

Machine translation for the description of WO 2014156350 (Year: 2014).*
Trindade et al. "Dissolution of gold in oxidized bromide solutions." in Hydrometallurgy '94. vol. I. pp. 527-540 (Year: 1994).*
Notification Concerning Transmittal of International Preliminary Report on Patentability; International Preliminary Report on Patentability; and English Translation of Written Opinion of the International Searching Authority, dated Oct. 11, 2018, issued in PCT/JP2017/013456 (Forms PCT/IB/326, PCT/IB/373 and PCT/ISA/237).
International Search Report (PCT/ISA/210) issued in PCT/JP2017/013456, dated Jun. 27, 2017.
Written Opinion (PCT/ISA/237) issued in PCT/JP2017/013456, dated Jun. 27, 2017.

* cited by examiner

[Fig. 1]
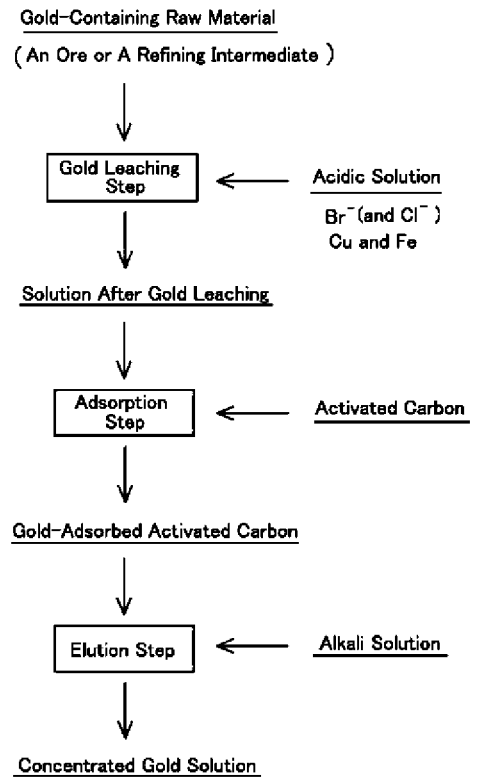
[Fig. 2]
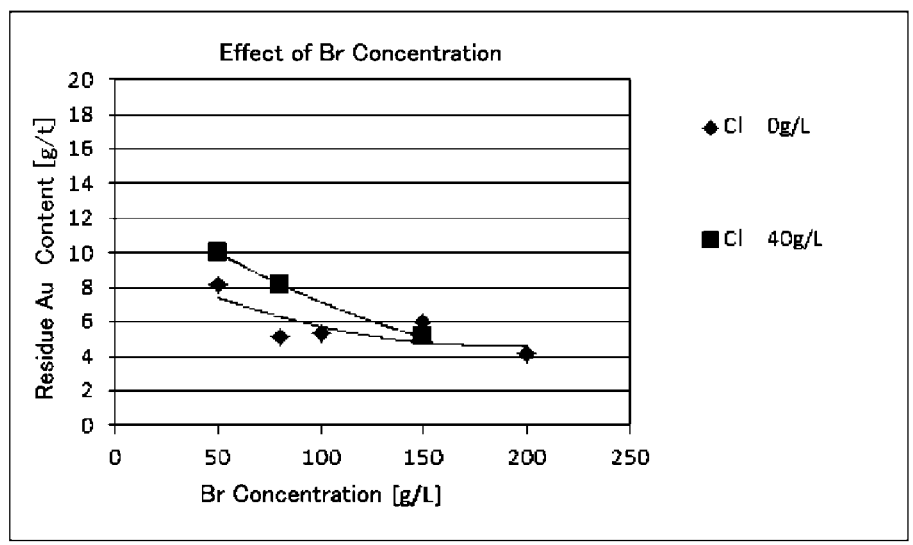

[Fig. 3]
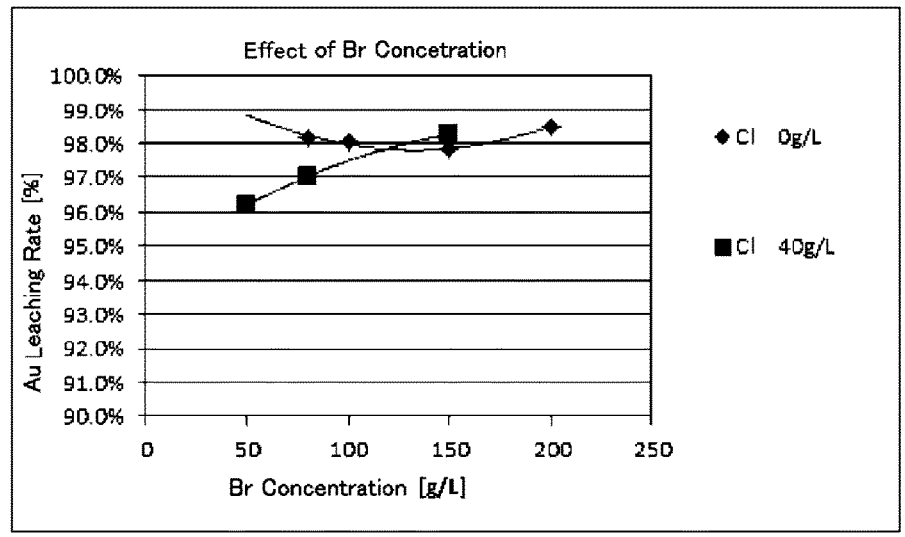
[Fig. 4]
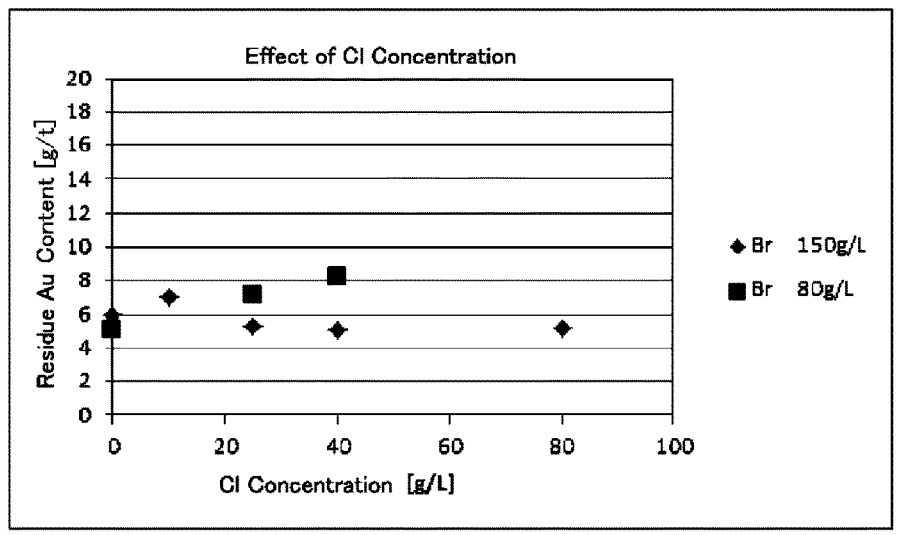
[Fig. 5]
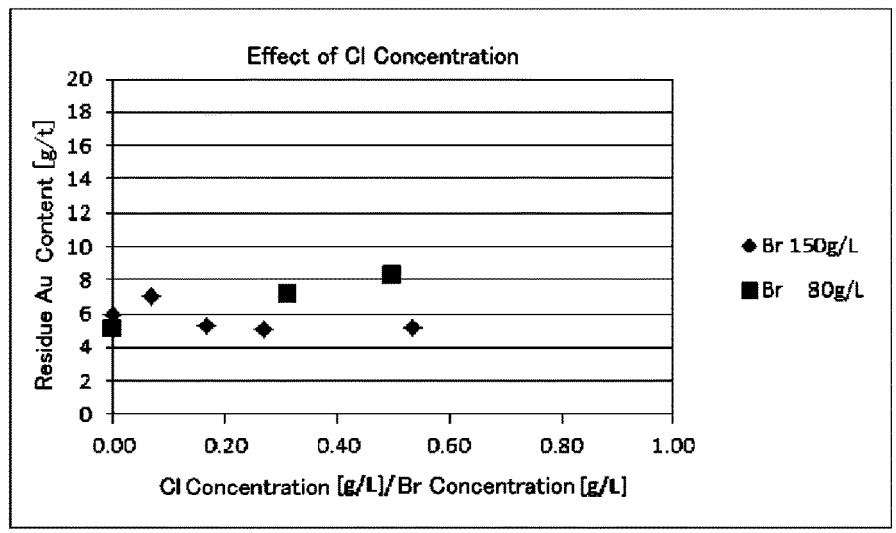

METHOD FOR RECOVERING GOLD FROM AN ORE OR A REFINING INTERMEDIATE CONTAINING GOLD

TECHNICAL FIELD

The present invention relates to a method for recovering gold that may be contained in an ore and a refining intermediate, and more particularly, it proposes a technique that will contribute to improvement of a recovery rate of gold.

BACKGROUND ART

For example, it is known to use a hydrometallurgical method in order to recover gold contained in ores such as chalcopyrite or other sulfide minerals and silicate minerals or gold contained in leaching residues (i.e., refining intermediates) obtained such as by leaching copper in copper sulfide ores or leaching iron in pyrite. Here, to leach gold contained in the ores or the refining intermediates in a solution, chemicals such as cyanides, thiourea, thiosulfuric acid and halogen gases have been conventionally used. However, the use of cyanide, among these chemicals, is often limited because of its toxicity, and so the use of such a chemical is not desired.

In such circumstances, it has been recently proposed to leach gold contained in the sulfide ores or like using an acidic halide solution containing an iron ion and a copper ion as a cation, and a chloride ion and a bromide ion as an anion, as described in Patent Document 1, for example. According to the proposed technique, gold can be easily leached as a polysulfide-type complex or the like, without using the cyanide that are toxic.

In addition, gold leached in the acidic solution can be recovered by adsorbing gold on an activated carbon and then eluting it with sodium hydroxide.

CITATION LIST

Patent Literature

PTL 1: Japanese Patent Application Public Disclosure (KOHYO) No. 2009-526912 A1

SUMMARY OF INVENTION

Technical Problem

To increase the recovery rate of gold by means of the activated carbon and the like, it is important to leach as much gold as possible in the acidic solution in a step of leaching gold, before the step of using the activated carbon. However, the prior art method as described in the above Patent Document 1 would not be able to sufficiently leach gold in the acidic solution. Therefore, there would be still room for improvement in such a prior art.

An object of the present invention is to solve such a problem of the prior art, and to provide a method for recovering gold in an ore or a refining intermediate by sufficiently leaching gold in raw materials resulting from the ore or the refining intermediate in an acidic solution containing a copper ion, an iron ion and a halide ion, which can contribute to improve the recovery rate of gold.

Solution to Problem

The prior art that leaches gold using the halide media as described above has been based on the supplying of a chloride ion by means of injecting of a chlorine gas or addition of a chloride compound to produce a chloride complex of gold, and has considered that the production of a bromide complex of gold by the additional supplying of the bromide ion would be able to improve the leaching rate of gold. However, the present inventors have conducted intensive studies and newly found that if the halide media contains the bromide ion as the halide ion, the halide media having a relatively higher bromide ion concentration but a relatively lower chloride ion concentration or no chloride ion could significantly improve the leaching ratio of gold.

Under such findings, the method for recovering gold from the ore or the refining intermediate according to the present invention relates to a method for recovering gold from an ore or a refining intermediate containing gold, the method comprising a step of contacting a gold-containing raw material obtained from the ore or the refining intermediate with an acidic solution containing a copper ion, an iron ion and a halide ion while supplying an oxidizing agent to leach the gold component in the raw material, the halide ion in the acidic solution comprising at least a bromide ion, wherein the concentration of the bromide ion in the acidic solution is 100 g/L or more, or the concentration of the bromide ion in the acidic solution is less than 100 g/L, and wherein when the concentration of the bromide ion is less than 100 g/L, a concentration ratio of the halide ions in the acidic solution is such that a ratio of the concentration of a chloride ion to the concentration of the bromide ion (a Cl/Br concentration ratio) is ⅓ or less.

Here, the concentration of the halide ion in the acidic solution is such that the concentration of the bromide ion is preferably 50 g/L or more, and more preferably 80 g/L or more.

Further, when the concentration of the bromide ion in the acidic solution is less than 100 g/L, the ratio of the concentration of the chloride ion to the concentration of the bromide ion in the acidic solution (the Cl/Br concentration ratio) is preferably ¼ or less.

Particularly, in the recovering method as stated above, the halide ion in the acidic solution is only the bromide ion.

In this case, a pH of the acidic solution is preferably 2 or less.

Advantageous Effects of Invention

According to the method for recovering gold from the ore or the refining intermediate of the present invention, gold in the raw material resulting from the ore or refining intermediate can be leached with a higher leaching rate, because the halide ion in the acidic solution comprises at least a bromide ion, and when the concentration of the bromide ion in the acidic solution is less than 100 g/L, the ratio of the concentration of chloride ion to the concentration of bromide ion (the Cl/Br concentration ratio) is ⅓ or less. As a result, it can contribute to improvement of the gold recovery rate.

BRIEF DESCRIPTION OF DRAWINGS

FIG. 1 is a flow diagram illustrating gold recovery processes that can be applied to a method for recovering gold from an one or a refining intermediate according to an embodiment of the present invention.

FIG. 2 is a graph showing relationship between a concentration of a bromide ion and an Au content of residue when chloride ion concentrations are 0 g/L and 40 g/L in Examples.

FIG. 3 is a graph showing relationship between a concentration of a bromide ion and an Au leaching rate when chloride ion concentrations are 0 g/L and 40 g/L in Examples.

FIG. 4 is a graph showing relationship between a concentration of a chloride ion and an Au content of residue when bromide ion concentrations are 150 g/L and 80 g/L in Examples.

FIG. 5 is a graph showing relationship between a Cl/Br concentration ratio and an Au content of residue when bromide ion concentrations are 150 g/L and 80 g/L in Examples.

DESCRIPTION OF EMBODIMENTS

Hereinafter, embodiments of the present invention will be described in detail.

The method for recovering gold from the ore or refining intermediate according to an embodiment of the invention relates to a method for recovering gold from an ore or refining intermediate containing gold, comprising a step of leaching gold in a raw material resulting from the ore or the refining intermediate while supplying an oxidizing agent, using an acidic solution containing a copper ion, an iron ion and a halide ion, wherein the halide ion comprises at least a bromide ion. In this case, the concentration of the bromide ion in the acidic solution is 100 g/L or more, or the concentration of the bromide ion in the acidic solution is less than 100 g/L, and when the concentration of the bromide ion is less than 100 g/L, the concentration ratio of the halide ions in the acidic solution is such that a ratio of the concentration of a chloride ion to the concentration of the bromide ion (a Cl/Br concentration ratio) is ⅓ or less.

The method for recovering gold can be applied to a gold recovery process shown by way of example in FIG. 1. In the process illustrated in FIG. 1, a raw material containing gold obtained from the ore and refining intermediate can subjected to a leaching step, adsorption step and elution step of gold in this order to provide a concentrated gold solution. Hereinafter, the present invention will be described below in line with these matters.

(Raw Material Containing Gold)

The ore and the refining intermediate can be, for example, gold-containing ores such as sulfide minerals and silicate minerals including one or more selected from chalcocite, bornite, covellite, chalcopyrite, pyrite, enargite, arsenopyrite, galena, sphalerite, arsenical pyrite, stibnite and pyrrhotite, or intermediates obtained by subjecting these ores to a refining process (also referred to as "refining intermediates").

It should be noted that the ore and the refining intermediate may be optionally a refined ore which has undergone a conventional ore dressing treatment such as ore flotation and gravity concentration of an ore. Further, they may be those which have the particle size decreased by grinding and milling the ore such that the acidic solution is easily contacted with gold inside the ore in the gold leaching step and the like. Furthermore, the method may include, as a pretreatment, a calcination step carried out at a certain temperature in the presence of oxygen or air or in an inert atmosphere. However, such a preliminary treatment is not essential and may be omitted as appropriate.

The gold-containing raw material to be leached in the present invention can be obtained from any of those ores or refining intermediates as stated above. More particularly, the gold-containing raw material is, for example, the ore itself or the refining intermediate obtained by the predetermined refining treatment as described above. In addition, the refining treatment as used herein refers to, for example, a treatment to leach copper by a predetermined leaching solution for the copper sulfide ore, or a treatment to leach iron by a predetermined leaching solution for the iron pyrite, or like, and a leached residue obtained by such a treatment may be the refining intermediate.

The concentration of gold in the raw material thus obtained is typically from about 1 to 500 ppm by mass, and more typically from about 10 to 50 ppm by mass.

(Gold Leaching Step)

The gold leaching step leaches gold in the raw material by contacting an acidic solution containing the copper ion, iron ion and halide ion, with the above raw material containing gold while supplying an oxidizing agent.

Here, the prior art method has used a large amount of chloride ion and additionally a small amount of bromide ion as the halide ion contained in the acidic solution. However, the present invention mainly forms a bromide complex of gold by the bromide ion to leach gold, provided that a small amount of chloride ion is contained or no chloride ion is contained. This is based on the new findings that the chloride ion acts to inhibit the leaching of gold by the bromide ion.

More specifically, the acidic solution in the gold leaching step contains at least the bromide ion as the halide ion, and when the concentration of the bromide ion in the acidic solution is less than 100 g/L, the concentration ratio of the halide ions is such that the ratio of the concentration of the chloride ion to the concentration of the bromide ion (the Cl/Br concentration ratio) is ⅓ or less. When the concentration of the bromide ion in the acidic solution is less than 100 g/L, the ratio of the concentration of the chloride ion to the concentration of the bromide ion in the acidic solution (the Cl/Br concentration ratio) may be more preferably 0.3 or less, and even more preferably ¼ or less. On the other hand, if the concentration of the bromide ion in the acidic solution is 100 g/L or more, a higher gold leaching rate can be exerted regardless of the concentration of the chloride ion. Therefore, when the concentration of the bromide ion is 100 g/L or more, the Cl/Br concentration ratio is not particularly limited.

This will allow the leaching rate of gold to be greatly increased. In addition, if no chloride ion is present in the acidic solution, the Cl/Br concentration ratio as stated above will be 0.

In order to further suppress the effect of the concentration of the chloride ion, when the concentration of the bromide ion is 120 g/L or more, the Cl/Br concentration ratio is not particularly limited, whereas when the concentration of the bromide ion is less than 120 g/L, the Cl/Br concentration ratio can be ⅓ or less, and preferably 0.3 or less, and more preferably ¼ or less.

Although it is not clear why the leaching rate of gold is improved by increasing the concentration of the bromide ion and decreasing the concentration of the chloride ion as stated above, the reason would be as follows: when elementary gold is dissolved, gold will be oxidized to $Au^{3+}$ via $Au^+$, but gold will be present in the form of $Au^+$ in the acidic solution in the gold leaching step; it is considered that gold in the halide media can be more stable in the form of a $[AuBr_2]^-$ in which two ions $Br^-$ are coordinated to $Au^+$, than in the form of a $[AuCl_2]^-$ in which two ions $Cl^-$ are coordinated to $Au^+$; therefore, an increased amount of $Cl^-$ in the halide media will increase the proportion of the gold ion with coordinated $Cl^-$ ($[AuCl_2]^-$), so that gold cannot be present in the form of ion and is immediately reduced to return to original elementary gold, and as a result, the leaching rate of gold cannot be enhanced so much; thus, the gold ion will be more stably present by increasing the amount of Br and decreasing the amount of Cl in the halide media, and as a result, the leaching rate of gold would be able to be greatly improved. However, the invention is not limited by such a theory.

It is should be noted that for the iron ion, a trivalent iron ion oxidized under the supply of an oxidizing agent or a trivalent iron ion present from the beginning functions to oxidize gold. The copper ion is not directly involved in the reaction, but the presence of the copper ion will increase the oxidation rate of the iron ion.

The concentration of the bromide ion in the acid solution may be preferably 50 g/L or more, and more preferably 80 g/L or more, and particularly 150 g/L or more, in terms of further improving the leaching rate of gold. Although there is no particularly preferred upper limit of the bromide ion concentration, but it may be preferably less than or equal to the solubility of a metal bromide to be added.

On the other hand, the concentration of the chloride ion may be preferably 40 g/L or less, and more preferably 25 g/L or less. Furthermore, it is still more preferable that the halide ion in the acidic solution is only the bromide ion, so that no chloride ion is present in the acidic solution.

The concentration of the iron ion in the acidic solution may be 50 g/L or less, and preferably from 0.01 g/L to 10 g/L. Furthermore, the concentration of the copper ion may be preferably 1 g/L or more, and more preferably 5 g/L or more, but from the economical viewpoint, any excessively high concentration is not required and the concentration of the copper ion in the acidic solution may be generally 30 g/L or less, and preferably 20 g/L or less.

In addition, each concentration of the bromide ion, chloride ion, copper ion and iron ion means the concentration in the acidic solution before contacting the acidic solution with the raw material.

The method of contacting the acidic solution with the raw material is not limited, and includes methods such as spraying and immersing, but a method of immersing the raw material in the acidic solution and then stirring it is preferred in terms of an efficiency of the reaction.

The supply sources of the bromide ion include, but not limited to, hydrogen bromide, hydrobromic acid, metal bromides, a bromine gas and the like, and the bromide ion is preferably supplied in the form of metal bromide in terms of economy and safety. The metal bromides include bromides such as copper bromides (copper (I) bromide, copper (II) bromide), iron bromides (iron (I) bromide, iron (II) bromide), bromides of alkali metals (lithium, sodium, potassium, rubidium, cesium, francium), bromides of alkaline earth metals (beryllium, magnesium, calcium, strontium, barium, radium), and sodium bromide is preferable in terms of economy and availability. In addition, the copper bromide and the iron bromide are preferably used because they can also be used as the supply sources for the copper ion and the iron ion.

If the chloride ion is contained, the supply sources include, but not limited to, for example, hydrogen chloride, hydrochloric acid, metal chlorides, a chlorine gas and the like, and they are preferably supplied in the form of metal chloride in view of economy and safety. Examples of the metal chlorides include, for example, copper chlorides (copper (I) chloride, copper (II) chloride), iron chlorides (iron (I) chloride, iron (II) chloride), chlorides of alkali metals (lithium, sodium, potassium, rubidium, cesium, francium), and chlorides of alkaline earth metals (beryllium, magnesium, calcium, strontium, barium, radium), and sodium chloride is preferred in terms of economy and availability. Moreover, it is also possible to use the copper chloride and the iron chloride because they can be utilized as sources for the copper ion and the iron ion.

The copper ion and the iron ion are usually supplied in the form of their salts, for example they can be supplied in the form of halide salts. The copper ion is preferably supplied as copper bromide and/or copper chloride, and the iron ion is preferably supplied as iron bromide and/or iron chloride, because these can be also used as sources for the chloride ion and/or the bromide ion. As the copper chlorides and the iron chlorides, copper (II) chloride ($CuCl_2$), copper (I) chloride (CuCl), iron (III) chloride ($FeCl_3$), iron (II) chloride ($FeCl_2$) and the like may be used. As the copper bromides and the iron bromides, copper (II) bromide ($CuBr_2$), copper (I) bromide (CuBr), iron (III) bromide ($FeBr_3$), iron (II) bromide ($FeBr_2$) and the like may be used.

A redox potential of the acidic solution at the start of the gold leaching step (vs. Ag/AgCl) is preferably 500 mV or more, and more preferably 600 mV or more, in terms of promoting the gold leaching. Further, a pH of the acidic solution is preferably maintained at 2.0 or less in terms of enhancing the leaching rate of gold, but the pH of the acidic solution is more preferably maintained at 0.5 to 1.9 because a higher pH will further facilitate the oxidation rate of iron. A temperature of the acidic solution is preferably 45° C. or higher, and more preferably 60° C. or higher in terms of enhancing the leaching rate of gold, but if the temperature is too high, the acidic solution may be evaporated or heating costs may be increased. Therefore, the temperature may be preferably 95° C. or less, and more preferably 85° C. or less.

In a preferred embodiment of the present invention, the acidic solution may be a mixed solution which contains at least one of hydrochloric acid and bromic acid, and at least one of copper (II) bromide and copper (II) chloride, and at least one of iron (III) bromide and iron (III) chloride, and at least one of sodium chloride and sodium bromide. However, as the halide ion in the acidic solution, the bromide ion is essential, whereas the chloride ion is not essential.

The gold leaching step is carried out while supplying an oxidizing agent to manage the redox potential. If the oxidizing agent is not added, the redox potential will decreases in the middle of the step and the leaching reaction will not proceed. The oxidizing agent includes, but not limited to, for example oxygen, air, chlorine gas, bromine gas, hydrogen peroxide and the like. No oxidizing agent with extremely high redox potential is needed, and air is sufficient.

Although the redox potential is not particularly adjusted during the leaching of gold, the redox potential (ORP) of the gold leaching solution after sufficiently performing the gold leaching may be generally from approximately 450 to 600 mV, and typically from approximately 500 to 580 mV.

An increase in ORP indicates a decrease in a monovalent copper ion in the solution after gold leaching. The monovalent copper is known as a very soft element, and has high affinity to the activated carbon and competes with the adsorption of the gold complex. By such a decrease in the monovalent copper, the adsorption active sites in the activated carbon increase the selectivity for gold, so that efficient recovery of gold can be achieved.

(Adsorption Step)

After the leaching reaction of gold, gold can be recovered from the gold-leached solution obtained by solid-liquid separation using the activated carbon adsorption. The contacting of gold with the activated carbon can be carried out in a batch or by continuously supplying an acidic leaching solution into an adsorption tower filled with the activated carbon.

In the case of the batch, the stirring speed is not particularly limited, and the activated carbon is added such that the amount of the activated carbon added is from 50 to 10000 times the amount of gold.

In the case of the method of continuous supplying the acid leaching solution, the rate of supplying the solution is not particularly limited (generally SV1 to 25). However, as an adsorption amount of gold per a unit weight of the activated carbon is 20000 to 30000 g/t, a decrease in adsorption capacity of the activated carbon may be observed. Therefore, the stripping of gold and regenerating of the activated carbon can be carried out on the basis of such an adsorption amount. The regenerating of the activated carbon can be carried out by various methods such as sulfur compounds and nitrogen compounds that are generally known in the art, and acids.

(Elution Step)

Gold adsorbed on the activated carbon is eluted by an alkaline solution, preferably NaOH or a mixed solution of NaOH and $Na_2S$. Here, if the alkali concentration is low, elution of gold becomes difficult, and if the alkali concentration is high, there is a risk of heat generation during preparation. From this point of view, when using NaOH, its concentration may be preferably from 0.05 to 1 M, and more preferably from 0.1 to 0.5 M. Further, an amount of $Na_2S$ used is preferably as low as possible because of its cost and difficulty of handling of this substance, but a reducing concentration of $Na_2S$ will decrease the effect of eluting gold. On the other hand, if the concentration of $Na_2S$ is too high, the effect will reach saturation, and the processing load of $Na_2S$ will be further increased. From such a viewpoint, when using the mixed solution of NaOH and $Na_2S$, the amount of $Na_2S$ added is preferably 0.1 to 10 mol times the amount of NaOH, and more preferably 0.5 to 1.5 mol times.

The elution may be carried out in a batch or by continuously supplying elute. However, when the elution is carried out in the batch, any vigorous agitation preferably should not be performed in order to avoid losing a charge by oxidation of the sulfide with oxygen so that gold is re-adsorbed on the activated carbon or deposited onto a reactor. When agitation is necessary, air is replaced with a non-oxidizing gas and agitated. Alternatively, the more amount of sodium sulfide added is set, or sodium sulfide is timely added. Further, the elution is preferably carried out under atmospheric pressure.

A concentrated gold solution can be obtained by elution from the activated carbon. The concentrated gold solution refers to a solution containing from 50 to 5000 mg/L of gold. A method for producing gold by reduction from the concentrated gold solution includes a chemical reduction method by reduction with sulfur dioxide or sodium oxalate, or solvent extraction-electrolytic extraction method. Elemental gold can be obtained by using both methods.

EXAMPLES

Next, the gold recovery method of the present invention was experimentally conducted and its effects were confirmed as described below. However, the descriptions herein are only for the purpose of illustration and are not intended to be limited thereto.

Sulfide minerals containing gold ores mined from Kensington mine were subjected to a predetermined treatment to obtain a raw material containing gold. The raw material with dry weight of 30 g was subjected to gold leaching under certain conditions of acidity or alkalinity, solution concentrations and temperatures as shown in Table 1. In the leached solutions thus obtained, each leaching rate of gold was determined by measuring each gold concentration and gold content in the leaching residue when the leaching times were 6 hours and 12 hours. Results are shown in Table 1. In Table 1, Test Example 6 could be measured for the Au content among the residue rate, Au content and Au leaching rate when leached for 12 hours, but could not be measured for the residue rate and Au leaching rate due to a mistake during the measurement.

In addition, the leaching treatment was carried out under a leaching condition of a pulp concentration of 15 g/L at a solution temperature of 85° C. and an agitation speed of 250 rpm. During the leaching treatment, air was sparged at 0.1 L/min/L. Further, during the leaching, hydrochloric acid was added such that the pH was 1.0 or less, as appropriate.

TABLE 1

| | | | Concentration of Solution | | | | | | | |
|---|---|---|---|---|---|---|---|---|---|---|
| | | Acidity or Alkalinity | | Cl/Br | Cl | | | Cl + | Cl/ (Cl + Br) | Br/ (Cl + Br) |
| | | Temperature | Cl g/L | Br g/L | g/L/ g/L | Mole mol/L | Br mol/L | Br mol/L | — | — |
| Effect of Cl (Br 150 g/L) | Test Example 1 | 85 | 0 | 150 | 0.00 | 0 | 1.9 | 1.9 | 0.0 | 1.00 |
| | Test Example 2 | 85 | 10 | 150 | 0.07 | 0.3 | 1.9 | 2.2 | 0.13 | 0.87 |
| | Test Example 3 | 85 | 25 | 150 | 0.17 | 0.7 | 1.9 | 2.6 | 0.27 | 0.73 |
| | Test Example 4 | 85 | 40 | 150 | 0.27 | 1.1 | 1.9 | 3.0 | 0.38 | 0.62 |
| | Test Example 5 | 85 | 80 | 150 | 0.53 | 2.3 | 1.9 | 4.1 | 0.55 | 0.45 |
| Effect of Br (Cl 0 g/L) | Test Example 6 | 85 | 0 | 50 | 0.00 | 0.0 | 0.6 | 0.6 | 0.00 | 1.00 |
| | Test Example 7 | 85 | 0 | 200 | 0.00 | 0.0 | 2.5 | 2.5 | 0.00 | 1.00 |
| | Test Example 8 | 85 | 0 | 100 | 0.00 | 0.0 | 1.3 | 1.3 | 0.00 | 1.00 |
| | Test Example 9 | 85 | 0 | 80 | 0.00 | 0.0 | 1.0 | 1.0 | 0.00 | 1.00 |
| | Test Example 10 | 85 | 0 | 150 | 0.00 | 0.0 | 1.9 | 1.9 | 0.00 | 1.00 |
| | Test Example 11 | 85 | 0 | 120 | 0.00 | 0.0 | 1.5 | 1.5 | 0.00 | 1.00 |
| Effect of Br (Cl 40 g/L) | Test Example 12 | 85 | 40 | 150 | 0.27 | 1.1 | 1.9 | 3.0 | 0.38 | 0.62 |
| | Test Example 13 | 85 | 40 | 80 | 0.50 | 1.1 | 1.0 | 2.1 | 0.53 | 0.47 |
| | Test Example 14 | 85 | 40 | 50 | 0.80 | 1.1 | 0.6 | 1.8 | 0.64 | 0.36 |
| | Test Example 15 | 85 | 40 | 100 | 0.40 | 1.1 | 1.3 | 2.4 | 0.47 | 0.5 |
| | Test Example 16 | 85 | 40 | 120 | 0.33 | 1.1 | 1.5 | 2.6 | 0.43 | 0.6 |
| Effect of Cl (Br 80 g/L) | Test Example 17 | 85 | 0 | 80 | 0.00 | 0.0 | 1.0 | 1.0 | 0.00 | 1.00 |
| | Test Example 18 | 85 | 25 | 80 | 0.31 | 0.7 | 1.0 | 1.7 | 0.41 | 0.59 |
| | Test Example 19 | 85 | 40 | 80 | 0.50 | 1.1 | 1.0 | 2.1 | 0.53 | 0.47 |

TABLE 1-continued

|  |  | Residue Rate | | Au Grade | | Au Leaching Rate | |
| --- | --- | --- | --- | --- | --- | --- | --- |
|  |  | 6 hrs | 12 hrs | 6 hrs | 12 hrs | 6 hrs | 12 hrs |
| Effect of Cl (Br 150 g/L) | Test Example 1 | 86.2% | 76.5% | 7.9 | 6 | 96.8% | 97.8% |
|  | Test Example 2 | 88.8% | 84.8% | 11 | 7 | 95.3% | 97.2% |
|  | Test Example 3 | 86.0% | 71.0% | 9.1 | 5.3 | 96.3% | 98.2% |
|  | Test Example 4 | 84.2% | 71.9% | 9.4 | 5.1 | 96.2% | 98.3% |
|  | Test Example 5 | 84.4% | 79.8% | 10 | 5.2 | 96.0% | 98.0% |
| Effect of Br (Cl 0 g/L) | Test Example 6 | 85.0% | — | 26 | 8.2 | 89.5% | — |
|  | Test Example 7 | 84.9% | 75.1% | 8.2 | 4.2 | 96.7% | 98.5% |
|  | Test Example 8 | 83.4% | 76.3% | 11 | 5.4 | 95.6% | 98.0% |
|  | Test Example 9 | 81.6% | 74.7% | 12 | 5.1 | 95.3% | 98.2% |
|  | Test Example 10 | 86.2% | 76.5% | 7.9 | 6 | 96.3% | 97.8% |
|  | Test Example 11 | 84.9% | 76.3% | 9.8 | 5.7 | 96.0% | 97.9% |
| Effect of Br (Cl 40 g/L) | Test Example 12 | 84.2% | 71.9% | 9.4 | 5.1 | 96.2% | 98.3% |
|  | Test Example 13 | 84.0% | 75.9% | 14 | 8.2 | 94.4% | 97.0% |
|  | Test Example 14 | 86.9% | 79.7% | 22 | 10 | 90.9% | 96.2% |
|  | Test Example 15 | 82.1% | 76.7% | 11 | 7.1 | 95.7% | 97.4% |
|  | Test Example 16 | 82.5% | 75.1% | 11 | 6.7 | 95.7% | 97.6% |
| Effect of Cl (Br 80 g/L) | Test Example 17 | 81.6% | 74.7% | 12 | 5.1 | 95.3% | 98.2% |
|  | Test Example 18 | 86.7% | 80.6% | 13 | 7.2 | 94.6% | 97.2% |
|  | Test Example 19 | 84.0% | 75.9% | 14 | 8.2 | 94.4% | 97.0% |

Among the results shown in Table 1, the relationship between the concentration of the bromide ion and the residue Au content when the leaching was performed for 12 hours, for Test Examples 6 to 16, is graphically shown in FIG. 2 for each case where the chloride ion concentrations were 0 g/L and 40 g/L, and the relationship between the concentration of the bromide ion and the Au leaching rate when the leaching was performed for 12 hours is graphically shown in FIG. 3.

As can be seen from FIGS. 2 and 3, when the concentration of the bromide ion is lower, the higher concentration of the chloride ion increases the residue Au content and deteriorates the Au leaching rate. On the other hand, in the case of the bromide ion concentration which is high to some extent, comparable residue Au content are obtained at both of the chloride ion concentrations. These results show that the effect of the chloride ion on the Au leaching rate in the case where both of the bromide ion and the chloride ion are contained is related to the concentration ratio of the bromide ion and the chloride ion rather than the bromide ion concentration itself.

Further, as can be seen from FIGS. 2 and 3, when the concentration of the chloride ion is 40 g/L and the concentration of the bromide ion is less than approximately 120 g/L, that is, when the Cl/Br concentration ratio exceeds ⅓, the gold content in the residue is increased and the gold leaching rate is decreased as compared with the case where the concentration of the chloride ion is 0 g/L.

Conversely, it is clear that when the Cl/Br concentration ratio is ⅓ or less, differences in the gold content in the residue and the gold leaching rate as compared with the case where the chloride ion is present are increased as the ratio decreases, so that the gold leaching rate tends to increase. Therefore, when the Cl/Br concentration ratio is ⅓ or less, gold can be effectively leached without having any effect of the chloride ion even if the chloride ion is contained. Further, the Cl/Br concentration ratio of ¼ or less would be more desirable.

Among the results shown in Table 1, the relationship between the concentration of the chloride ion and the residue Au content when the leaching was performed for 12 hours, for each of Test Examples 1 to 5 and 17-19, is graphically shown in FIG. 4 for each case where the bromide ion concentrations were 150 g/L and 80 g/L, and the relationship between the Cl/Br concentration ratio and the residue Au content when the leaching was performed for 12 hours is graphically shown in FIG. 5.

FIGS. 4 and 5 clearly shows that the higher concentration of the bromide ion of 150 g/L yields sufficiently low residue Au content, irrespective of the chloride ion concentration and the Cl/Br concentration ratio. Accordingly, it has been found that a relatively higher concentration of the bromide ion can provide a higher leaching rate of gold without having any effect of the chloride ion concentration.

It has been found from the above results that, according to the method for recovering gold of the present invention, gold in the raw material obtained from the sulfide mineral can be leached with a higher leaching rate, so that the recovery rate of gold can be improved.

The invention claimed is:

1. A method for recovering gold from an ore or a refining intermediate containing gold, the method comprising a step of contacting a gold-containing raw material obtained from the ore or the refining intermediate with an acidic solution containing a copper ion, an iron ion and a halide ion while supplying an oxidizing agent to leach the gold component in the raw material, the halide ion in the acidic solution is only a bromide ion.

2. The method according to claim 1, wherein the concentration of the halide ion in the acidic solution is such that the concentration of the bromide ion is 50 g/L or more.

3. The method according to claim 2, wherein the concentration of the bromide ion in the acidic solution is 80 g/L or more.

4. The method according to claim 1, wherein a pH of the acidic solution is 2 or less.

* * * * *